UNITED STATES PATENT OFFICE.

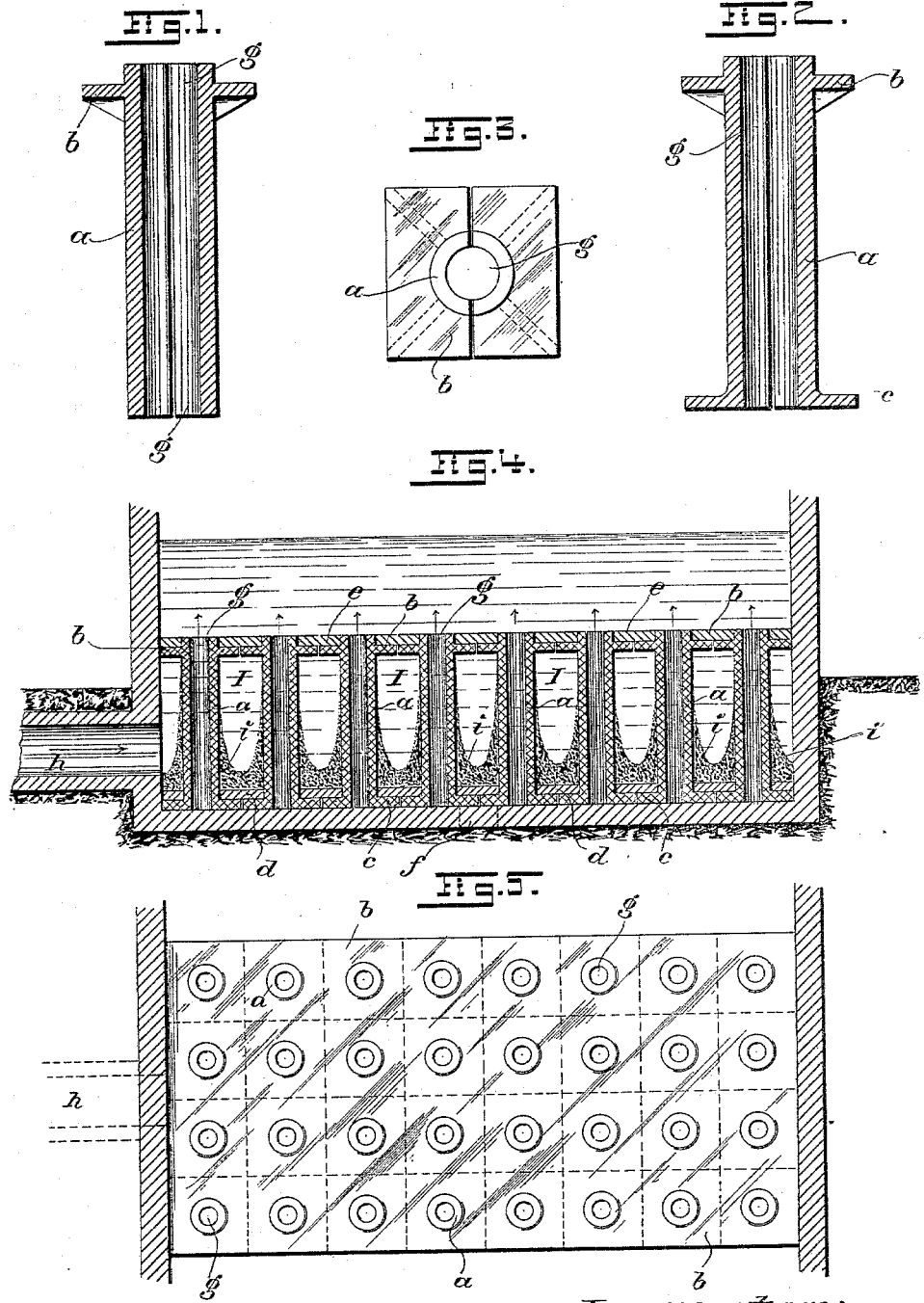

RICHARD KURKA, OF VIENNA, AUSTRIA-HUNGARY.

FILTER FOR WATERWORKS.

SPECIFICATION forming part of Letters Patent No. 597,680, dated January 18, 1898.

Application filed July 10, 1897. Serial No. 644,146. (No model.)

*To all whom it may concern:*

Be it known that I, RICHARD KURKA, manufacturer of filters, a subject of the Emperor of Austria-Hungary, and a resident of Vienna, in the Empire of Austria-Hungary, have invented a new and useful Filter for Waterworks, of which the following is a full, clear, and exact description.

This invention relates to a filter for waterworks, consisting of individual elements which may be easily set together to form a filter of exceedingly simple construction and absolutely sure in its function.

The invention is illustrated in the annexed drawings, of which—

Figure 1 is an elevation of a filter element without base. Fig. 2 is the same with base. Fig. 3 is a filter element in a plan view. Fig. 4 shows the combination of the individual elements in a sectional elevation, and Fig. 5 in a plan view.

The improved filter consists of separate elements of the form shown in Figs. 1, 2, and 3. They are formed of a tube $a$, of porous artificial or natural stone, with a square flange $b$, above which the tube $a$ is somewhat projected, while at its base the tube $a$ can end even, Fig. 1, or also with a square flange $c$. The elements are, when made of artificial stone, preferably divided in two parts, so that they are more easily to be molded. They are then clayed together. Elements of natural stone are generally made in one piece, and if this is not possible of two or more pieces, which are then cemented together.

Figs. 4 and 5 show how the different elements are combined by placing them in an upright position with the flange $b$ at the upper side, one against the other, so that a horizontal plane is formed at the top, from which the short tube-butts of the individual elements project.

At the bottom of the reservoir or tank in which the filter is set the individual elements are either set up with the circular tube-sections or with the broad surface of the flange $c$, Figs. 2 and 4, and are rendered dense and solid by a suitable high layer of water-tight material $d$, (beton, masonry, &c.) With those elements which are set up only by the tube-section the layer $d$ fills up the space between the different elements to a certain height and rests direct on the bottom of the reservoir. In case the elements are set up with the flange $c$ the layer rests on these flanges, Fig. 4, and thus joins the different elements tightly together. On the upper surface formed by a square flange $b$ of each element a water-tight layer (beton, &c.) is likewise placed, so that it forms, together with the tube-butts $a$, one surface, with openings $g$ for each element. In order to prevent the whole filter arrangement being lifted up by the pressure of the water, it may be fastened to the tank or reservoir by means of bars or bolts, &c. The distance I between the different elements, between the lower layer $d$ and the upper surface, serves as a receiver for the filtering mass $i$, consisting of infusorial earth, ground bricks, peat, clay, charcoal, &c. The porous tubes $a$ of the elements have a sucking effect upon this filtering mass, and consequently the latter will adhere to these tubes.

In the bottom of the reservoir an opening $f$, closed by means of a slide, is provided, by which the mire is drawn off from time to time.

The proceeding of the filtration is as follows: The water which is to be filtered passes under pressure through the opening $h$ into the space I between the filter elements, fills this space completely up, and runs, after passing through the filtering mass $i$ and the porous filter-cylinders $a$, into the hollow space of the latter, through which it rises and fills the space I I above the filter with perfectly clear pure water fit for use, and is from there let off for use. The residue contained in the water gathers in the filtering mass $i$ and in the pores of the filter-cylinder $a$, which fact necessitates from time to time the cleansing and renewal of the water.

Having now particularly described and ascertained the nature of my invention, I declare that what I claim, and wish to secure by Letters Patent, is—

Filter for water, drain-water and excrements, consisting of tubes $a$ of porous artificial or natural stone, with or without flange $c$ and provided at a small distance below the upper end with square flange $b$; which tubes are adapted for a filter, by being held and rendered dense at the bottom by means of a water-tight layer (beton, masonry, &c.) $d$, in which the elements are set up, or which is laid upon the lower flange $c$, and by having likewise a layer $e$ corresponding to the height of the projecting tube-butts $a$ on the square surfaces $b$, which layer together with the staying fixes the position of the different elements and limits a space for the unfiltered and one for the filtered water.

In testimony whereof I affix my signature in presence of two witnesses.

RICHARD KURKA.

Witnesses:
KARL HÜTTER,
HARRY BELMONT.